J. MASCARI.
VEHICLE FENDER.
APPLICATION FILED FEB. 28, 1911.

1,079,872.

Patented Nov. 25, 1913.
2 SHEETS—SHEET 1.

Witnesses
Thos. F. Knox,
R. A. Hoster

Inventor
Joseph Mascari
By Victor J. Evans
Attorney

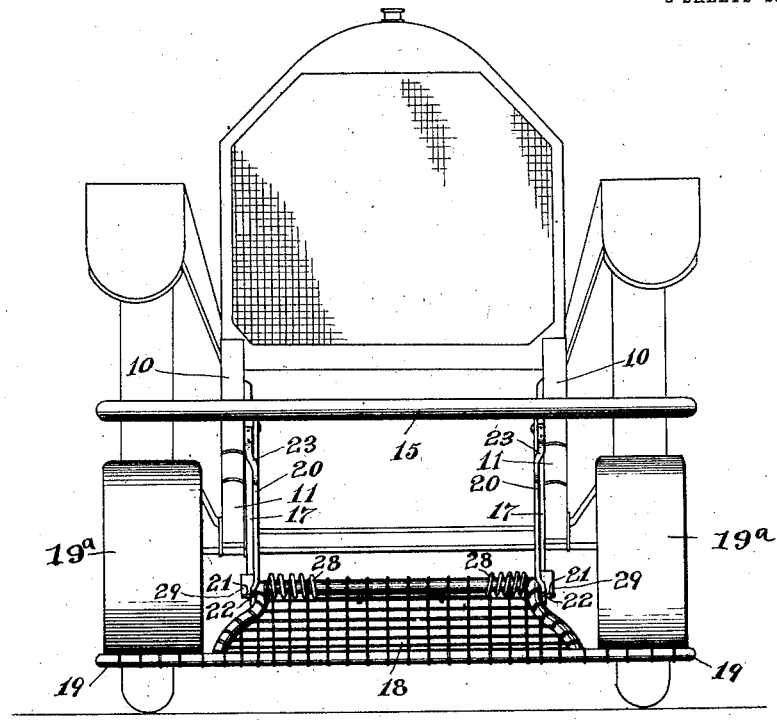
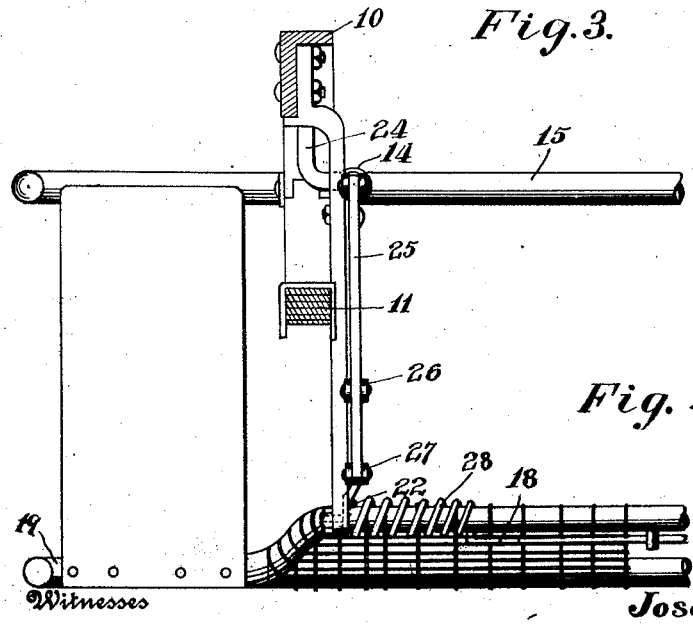

UNITED STATES PATENT OFFICE.

JOSEPH MASCARI, OF MEMPHIS, TENNESSEE.

VEHICLE-FENDER.

1,079,872.

Specification of Letters Patent.   Patented Nov. 25, 1913.

Application filed February 23, 1912. Serial No. 611,825.

*To all whom it may concern:*

Be it known that I, JOSEPH MASCARI, a citizen of the United States, residing at Memphis, in the county of Shelby and State of Tennessee, have invented new and useful Improvements in Vehicle-Fenders, of which the following is a specification.

An object of the invention is to provide a device for attachment to vehicles to prevent fatal injury to persons struck by the vehicle and thrown to the ground in front of the same.

Among other features, the invention has in view a bumper mounted to extend outwardly from the springs of the vehicle and adapted to have an inward sliding movement, and an apron disposed beneath the springs of the said vehicle at the forward end and extending outwardly therefrom, said apron being normally raised a distance from the ground, and means connecting the said apron with the said bumper for releasing the apron to move downwardly when the said bumper is moved inwardly.

Although I am aware that several devices adapted for preventing injury to people and attached to motor vehicles and the like have been used heretofore, the said devices are in most cases inefficient in operation and are controlled by a person seated in the vehicle.

In my device I employ a fender whose operation is entirely automatic and in the application of which when a person strikes the foremost part of the fender and falls to the ground, a catch apron is released by the action of the bumper to catch the person and prevent the same from being run over by the vehicle.

Reference is to be had to the accompanying drawings constituting a part of this specification, in which similar characters of reference denote corresponding parts in all the views, and in which—

Figure 1:
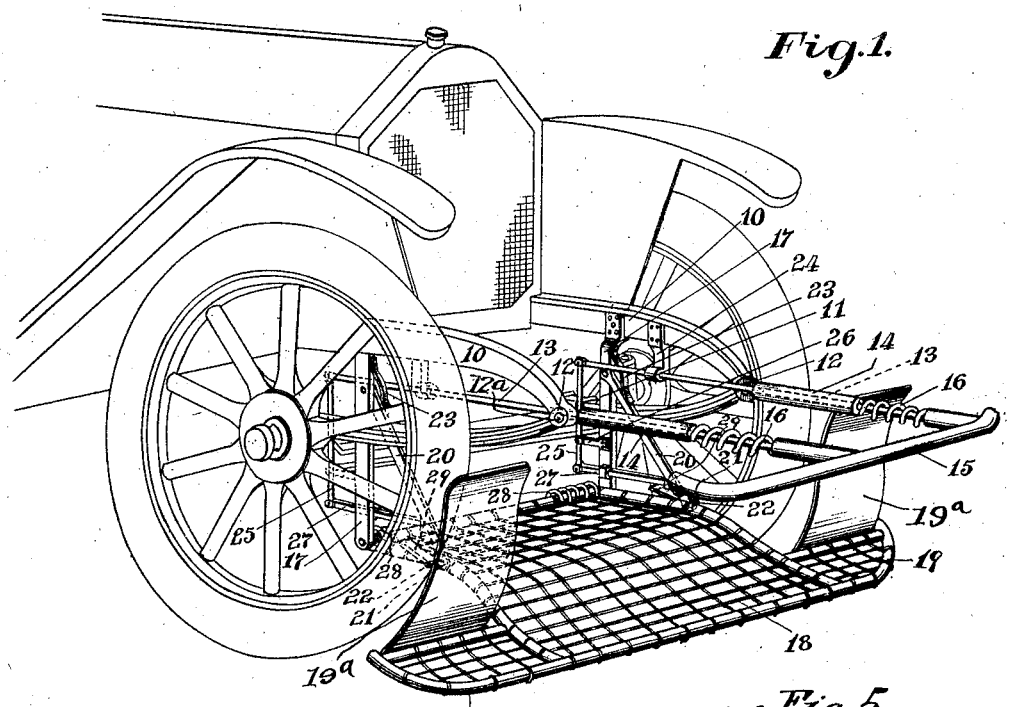
Figure 5:
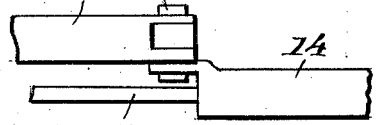
Figure 2:
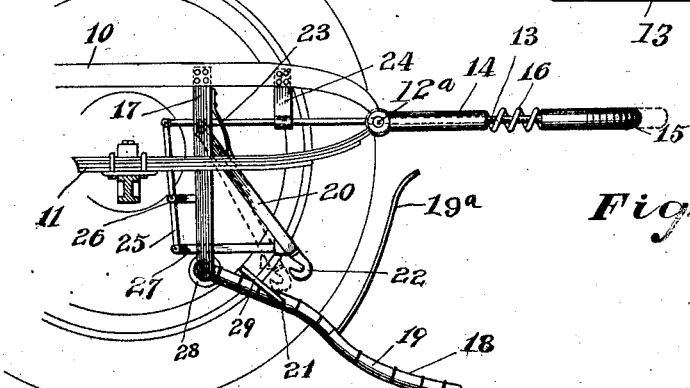

Figure 1 is a perspective view disclosing my device in its initial position, attached to the front of a vehicle. Fig. 2 is a side elevation disclosing my device in its final position, and in which the bumper has been operated to release the apron. Fig. 3 is a front elevation of the device when the same is in its initial position, and Fig. 4 is a fragmentary enlarged vertical sectional view, looking toward the rear of the catch apron, the same being in lowered position, as shown in Fig. 2. Fig. 5 is a fragmentary plan view of one of the side frames showing the manner of supporting one of the sleeves thereon.

Referring more particularly to the views, I disclose a plurality of side frames 10 forming a part of the chassis of the running gear of a vehicle, and which are curved downwardly at their forward ends for connection with the forward ends of springs 11 of the vehicle, the mentioned side frames terminating in eyes 12, having connection with the forward ends of the springs 11 by a pin $12^a$ projecting transversely through the eyes and through the forward ends of the springs, this being the usual construction in the form of vehicle disclosed, it being understood that any desired form or construction of this kind can be employed. Rods 13 extend forwardly adjacent the eyes 12 and slide in sleeves 14 extending forwardly from the eyes 12 and secured to the eyes by the pin $12^a$ or, if desirable, formed integrally with the eyes and the side frames 10; a bumper 15 being connected to the rods at their outer extremities with helical springs 16 encircling the rods and interposed between the forward ends of the sleeves 14 and the inner ends of the bumper.

Suitable supporting bars 17 are mounted to depend from the supports 10 and hingedly mounted thereon is a catch apron 18 having suitable extension guards 19 extending outwardly from the ends thereof, the said extension guards 19 being substantially disposed a distance in front of the front wheels of the vehicle. Rigidly secured to the extension guards 19 are upwardly extending guard plates $19^a$, arranged in front of the front wheels of the vehicle and extending upwardly over the extension guards 19. Hingedly mounted on the bars 17 are retaining bars 20, having their lower ends provided with hooks 22 for engagement with lugs 21 secured to the apron 18 and springs 23 are mounted on the bars 17 and engage the retaining bars 20 to hold the said hooks 21 in engagement with the lugs 22, thus supporting the apron 18 in normal position a distance above the ground. Each rod 13 extends rearwardly between the side frames support 10 and the springs 11 and passes through a bearing 24 depending from the side frames 10, the inner extremities of the rods 13 being hingedly connected to levers 25 mounted to swing on brackets 26 secured to the bars 17. The lower ends of the levers 25 are pivotally connected to actuating rods 27 slidable in suitable bearings on the bars 17 and the said actuating rods extend to within a short distance of the retaining bars 20.

In the application of my device, when a person is struck by the bumper 15, the same is moved inwardly, thus also moving the rods 13 inwardly and the said rods being pivoted to the levers 25, which in turn are pivoted to the actuating rods 27, move the said bars 27 to engage the retaining bars 20 and release the same from connection with the lugs 21 of the apron 18, thus permitting the apron 18 to drop downwardly to within a short distance of the ground so that after the person has been struck by the bumper 15 and has fallen to the ground, the apron 18 will act as a net to pick up the person and to prevent the same from being injured, as will be readily understood by referring to the figures. In order to replace the bumper 18 after the same has been moved downwardly as mentioned, the apron is lifted until the hooks 22 and the retaining bars 20 reëngage the lugs 21, the said retaining bars 20 being actuated by the springs 23 mounted on the bars 17.

From the foregoing description it will be readily seen that an efficient automatic fender is provided and which will at all times prevent any one from being run over by the vehicle after the said person has been struck by the bumper 15 mounted at the forward end of the vehicle.

Although the fender 18 will move gravitationally downward when released from the retaining bars 20, I have provided a plurality of helical springs 28 mounted on the fulcrum member of the fender 18 so that when the fender is released from the retaining bar 20, the springs 28 will force the same downwardly and tend to hold the fender in its lowered position. In order that the hooks 22 of the retaining bars 20 will easily reëngage the fender 18 when the same is moved upwardly, I have provided suitable guides 29 forming integral portions of the hooks 21 on the ends of the fender, the said guides being engaged by the hook 22 when the fender is in lowered position, as shown in dotted lines in Fig. 2, so that when the fender is moved upward or to initial position, the hooks will slide on the guides 29 so that they will automatically reëngage the fender to retain the same in its upward position when the same is moved upwardly.

Although the above mentioned springs 28 and the guides 29 can be dispensed with, it will be understood that a more efficient device is provided when the said springs 28 and guides 29 are employed thereon and it will be further understood that the scope of my invention is substantially defined in the appended claim.

Having thus fully described the invention, what I claim as new, is:—

In a fender for vehicles, the combination with sleeves carried by the chassis of the vehicle and projecting forwardly therefrom, of rods slidable longitudinally in the said sleeves and projecting beyond the ends thereof, a bumper carried on the forward ends of the said rods, supports on the said chassis and through which the rear ends of the said rods slide, depending supporting bars secured to the chassis of the vehicle, brackets projecting laterally rearward from the depending bars, levers mounted to swing on the said brackets and having pivotal connection at their upper ends with the said rods, an apron mounted to swing on the said depending supporting bars, retaining bars mounted to swing on the depending supporting bars and terminating at their lower ends in hooks, lugs carried by the apron and normally engaged by the hooks of the retaining bars, and actuating bars having pivotal connection with the said levers and with the said retaining bars, for disengaging the hooks of the retaining bars from the lugs of the apron when a rearward pressure is exerted on the said bumper.

In testimony whereof I affix my signature in presence of two witnesses.

JOSEPH MASCARI.

Witnesses:
 ROSORIO SANE,
 LOGAN COATS.